(12) United States Patent
Solbach

(10) Patent No.: US 6,680,692 B2
(45) Date of Patent: Jan. 20, 2004

(54) CONTINUOUS-WAVE RADAR WITH REFLECTION-MODULATOR

(75) Inventor: Klaus Solbach, Mulheim (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 10/195,123

(22) Filed: Jul. 15, 2002

(65) Prior Publication Data

US 2003/0020649 A1 Jan. 30, 2003

(30) Foreign Application Priority Data

Jul. 14, 2001 (DE) .......................... 101 34 386

(51) Int. Cl.$^7$ .............................. G01S 7/40; G01S 13/00

(52) U.S. Cl. ........................................ 342/165; 342/198

(58) Field of Search ................................ 342/159, 165, 342/175, 198

(56) References Cited

U.S. PATENT DOCUMENTS 4,725,842 A * 2/1988 Mayberry .................... 342/198
4,968,967 A * 11/1990 Stove ........................... 342/165
4,970,519 A * 11/1990 Minnis et al. ............... 342/165

FOREIGN PATENT DOCUMENTS

DE 19918767 10/2000

OTHER PUBLICATIONS

Solving the problems of a single antenna frequency modulated CW radar Beasley, P.D.L.; Stove, A.G.; Reits, B.J.; As, B.; Radar Conference, 1990., Record of the IEEE 1990 International, May 7–10, 1990 Page(s): 391–395.*

Development of a 3 cm band reflected power canceller Qi Jiming; Qu Xinjian; Ren Zhijiu; Radar, 2001 CIE International Conference on, Proceedings, 2001 Page(s): 1098–1102.*

\* cited by examiner

Primary Examiner—Thomas H. Tarcza
Assistant Examiner—Brian Andrea
(74) Attorney, Agent, or Firm—Crowell & Moring LLP

(57) ABSTRACT

A continuous wave radar system includes a transmitter circuit for generating radar transmitting signals, a transmit/receive antenna, coupled to the transmitter circuit by way of a circulator, and a receiver circuit, which is coupled to the transmit/receive antenna by way of the circulator and which is intended to process radar echo signals of a target object. The radar echo signals are received at the transmit/receive antenna, wherein the circulator serves to pass the transmitting signals, generated by the transmitter circuit, to the transmit/receive antenna and to divert the target object's echo signals, which are received by the transmit/receive antenna, to the input of the receiver circuit. The system further includes an RPC circuit for suppressing parts of the transmitting signals, diverted from the transmitter circuit and/or by means of reflection from the transmit/receive antenna directly into the receiver circuit, in response to a control signal, which is derived from the receiver circuit and which contains a reflection-modulator circuit, connected into the signal path between the circulator and the transmit/receive antenna, for the purpose of generating a correction signal, compensating for the directly diverted parts of the transmitting signal. The invention provides that the reflection modulator circuit contains a directional coupler arrangement for uncoupling a part of the signal, traversing the signal path between the circulator and the transmit/receive antenna, and a controllable line termination arrangement, attached to the directional coupler arrangement, for the purpose of setting the reflection and/or the absorption of the coupled signal in the sense of generating the correction signal in response to the control signal, derived from the receiver circuit.

22 Claims, 2 Drawing Sheets

CONTINUOUS-WAVE RADAR WITH REFLECTION-MODULATOR

SUMMARY AND BACKGROUND OF THE INVENTION

This application claims the priority of Application No. 101 34 386.8, filed Jul. 14, 2001, in Germany, the disclosure of which is expressly incorporated by reference herein.

The present invention relates to a continuous wave radar system.

The continuous wave radar system has a transmitter circuit for generating radar transmitting signals, a transmit/receive antenna coupled to the transmitter circuit by way of a circulator, and a receiver circuit, which is coupled to the transmit/receive antenna by way of the circulator and which is intended to process radar echo signals of a target object. The radar echo signals are received at the transmit/receive antenna. The circulator serves to pass the transmitting signals, generated by the transmitter circuit, to the transmit/receive antenna and to divert the target object's echo signals, received by the transmit/receive antenna, to the input of the receiver circuit. An RPC circuit is provided to suppress parts of the transmitting signals, diverted from the transmitter circuit and/or by means of reflection from the transmit/receive antenna directly into the receiver circuit in response to a control signal derived from the receiver circuit. The RPC circuit contains a reflection-modulator circuit connected into the signal path between the circulator and the transmit/receive antenna for the purpose of generating a correction signal compensating for the directly diverted parts of the transmitting signal.

In the past, the compensation or correction signal was obtained by coupling out at the transmitter output, by controlling the signal's amplitude and phase via a quadrature modulator circuit and finally by feeding the signal into the signal path leading to the receiver circuit by way of a directional coupler. This past concept has the advantage of a substantial separation of the actual radar circuit and the RPC circuit as the additional component. However, it is expensive with respect to the number of components and their complexity, in particular, the quadrature modulator circuit.

A continuous wave radar system with a common transmit and receive antenna offers the possibility of generating the compensation and correction signal by means of a controlled reflection point in the antenna feed line and, thus, the possibility of forming a reflection modulator circuit. Such a concept has already been described by John D. Harmer and William S. O'Hare, "Some Advances in CW Radar Techniques," Conference Proceedings of Nat. Conv. on Military Electronics, 1961, pp. 311–323. In this article, a three-dimensional waveguide module may be used in the form of a "magic T circuit," which can be produced only by waveguide technology, and is not suited for an integration of the circuit and where owing to the dimensions in the "magic T circuit" the two stages for generating the in-phase signal and the quadrature signal on the connecting line have to be displaced in space at a distance of significantly more than $\lambda/8$ ($\lambda$=wavelength on the line). Thus, a shift of the signals by 90° may be realized for only a small frequency band.

An object of the invention is to provide a continuous wave radar system of the class described above that may be produced with components that are easy to integrate.

This problem is solved by means of a continuous wave radar system with features described herein.

Other advantageous developments of the continuous wave radar system of the invention are described herein.

The invention provides a continuous wave radar system, having a transmitter circuit for generating radar transmitting signals, a transmit/receive antenna, coupled by way of a circulator to the transmitter circuit, and a receiver circuit, coupled by way of the circulator to the transmit/receive antenna, for processing radar echo signals of a target object. These radar echo signals are received at the transmit/receive antenna. The circulator serves to pass the transmitting signals, generated by the transmitter circuit, to the transmit/receive antenna, and to divert the target object's echo signals, which are received by the transmit/receive antenna, to the input of the receiver circuit. To suppress parts of the transmitting signals, diverted from the transmitter circuit and/or by means of reflection from the transmit/receive antenna directly into the receiver circuit, in response to a control signal, derived from the receiver circuit, there is an RPC circuit that contains a reflection modulator circuit, wired into the signal path between the circulator and the transmit/receive antenna, for the purpose of generating a correction signal, compensating for the directly diverted parts of the transmitting signal. The invention provides that the reflection modulator circuit contains a directional coupler arrangement for uncoupling a part of the signal, traversing the signal path between the circulator and the transmit/receive antenna, and a controllable line termination arrangement, attached to the directional coupler arrangement, for the purpose of setting the reflection and/or the absorption of the coupled out signal in the sense of generating the correction signal in response to the control signal, derived from the receiver circuit.

A significant advantage of this type of circuit is that the reflection modulator circuit may be produced in integrated circuit techniques by means of different line techniques. Another advantage of the present invention is that a quadrature (90° shift of I and Q signals) is possible over a wide range of frequencies.

A preferred embodiment of the present invention provides that the directional coupler arrangement includes a first directional coupler and a first branch of the line, coupled by way of the first directional coupler to the signal path between the circulator and the transmit/receive antenna, for the purpose of coupling out an in-phase component from this signal path; and a second directional coupler and a second branch of the line, coupled by way of the second directional coupler to the signal path between the circulator and the transmit/receive antenna, for the purpose of coupling out a quadrature component from this signal path. At one end of the first branch of the line there is a first controllable line termination for setting the reflection and/or absorption of the coupled in-phase component, and at one end of the second branch of the line there is a second controllable line termination for setting the reflection and/or absorption of the coupled quadrature component. The coupled waves may be reflected with positive or negative phase or also totally absorbed by means of the controllable line terminations as a function of their control state. The reflected waves run by way of the directional coupler into the signal path between the circulator and the transmit/receive antenna, where they appear reduced in size by the coupling factor and run as the reflected waves backwards to the circulator, and from there to the receiver and may compensate for an undesired directly diverted signal.

Preferably, it is provided that a first absorber is located on the other end of the first branch of the line, and that a second absorber is located on the other end of the second branch of the line.

Another advantageous embodiment of the invention provides that the directional coupler arrangement includes a first directional coupler for dividing a first part of the signal path, which is connected to the circulator and is provided between the circulator and the transmit/receive antenna, into a first branch of the line and a second branch of the line. It further includes second and third directional couplers for coupling the first and second branches of the line to a third and fourth branch of the line, respectively. It also includes a fourth directional coupler for combining the third and fourth branches of the line to form a second part of the signal path, which is connected to the transmit/receive antenna and is provided between the circulator and the transmit/receive antenna. On one end of the branch of the line there are controllable line terminations for setting the reflection and/or absorption of in-phase and quadrature components of the signal coupled from the signal path. This embodiment exploits the property of directional couplers of 90° phase shift of the coupled wave and the wave on the main line, a factor that can be used for the purpose of quadrature and extinguishing portions of the signal.

Preferably, one end of the first branch of the line is provided with a controllable line termination, and the other end of the first branch of the line is connected to the circulator.

Furthermore, it is advantageous if one end of the fourth branch of the line is provided with a controllable line termination, and the other end of the fourth branch of the line is connected to the transmit/receive antenna.

Preferably, a controllable line termination is provided on one end of the second and third branches of the line, and an absorber is provided on the other end of the second and third branch of the line, respectively.

According to another preferred embodiment, a line length difference of $\lambda/8$ is provided between the second directional coupler and the third directional coupler in order to obtain a 90° shift of the signals reflected in the second and third branch of the line.

It is preferable for the controllable line terminations, allocated in pairs to each other, to be provided on one end of the first and third branches on the line and on one end of the second and fourth branches of the line.

In all of the embodiments, the controllable line terminations can be formed by means of PIN diodes, by means of FET circuits or by means of varactor diodes.

Other objects, advantages and novel features of the present invention will become apparent from the following detailed description of the invention when considered in conjunction with the accompanying drawings.

DETAILED DESCRIPTION OF THE DRAWINGS

Figure 1:
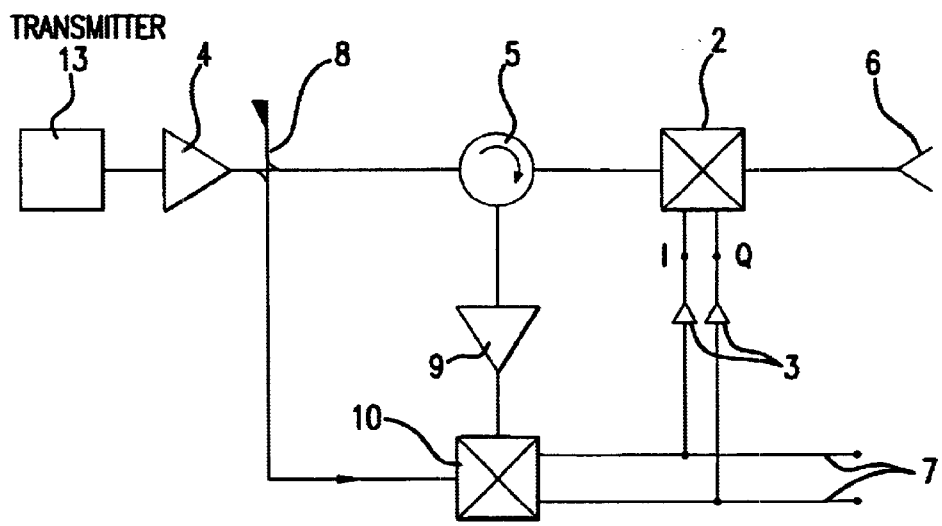
FIG. 1 is a block diagram of one embodiment of a continuous wave radar system for the purpose of illustrating an embodiment of the invention.

In the block diagram shown in FIG. 1, the reference numeral 13 denotes a transmitter of a continuous wave radar system. An amplifier final stage 4 is connected to the output of transmitter 13. The transmitter circuit 13, 4 formed by the transmitter 13 and the amplifier final stage 4 serves to generate radar transmitting signals, which may be fed to a transmit/receive antenna 6, which is coupled by way of a circulator 5 to the transmitter circuit 13, 4. Furthermore, a receiver circuit 9, 10 is coupled to the transmit/receive antenna 6 by way of the circulator 5. The receiver circuit 9, 10 includes a low noise receiver amplifier 9 and a receiver mixer 10. The receiver circuit 9, 10 serves to process a target object's radar echo signals that are received at the transmit/receive antenna 6 and are fed by way of the circulator 5 into the receiver amplifier 9. The circulator 5 provides, on the one hand, for forwarding the transmitting signal, generated by the transmitter circuit 13, 4 to the transmit/receive antenna 6 and, on the other hand, for diverting the target object's echo signals, which are received by the transmit/receive antenna 6 to the input of the receiver circuit 9, 10.

For purposes of suppressing parts of the transmitting signals that are diverted from the transmitter circuit 13, 4 by means of undesired coupling in the circulator 5 and/or by means of reflection from the transmit/receive antenna 6 directly into the receiver circuit 9, 10, an RPC circuit 2, 3 comprises a reflection-modulator 2 and two regulating amplifiers 3 whose outputs are coupled to I and Q inputs for an in-phase signal and a quadrature phase signal at the reflection-modulator 2, and whose inputs are coupled to the intermediate frequency outputs 7 of the receiver mixer 10. Furthermore, a part of the transmitting signal, which is coupled by way of a directional coupler 8 from the signal path between the transmitter circuit 13, 4 and the circulator 5 is fed to the receiver mixer 10. The RPC circuit 2, 3, formed by the reflection-modulator 2 and the regulating amplifiers 3, generates a correction signal in response to the control signal, derived from the receiver circuit 9, 10. This signal compensates for the parts of the transmitting signal that are diverted from the transmitter circuit 13, 4 by means of undesired coupling in the circulator 5 directly into the receiver circuit 9, 10, or the parts of the transmitting signal that are diverted by means of reflection from the transmit/receive antenna 6 without radiation by means of the same directly into the receiver circuit 9, 10.

Figure 2:
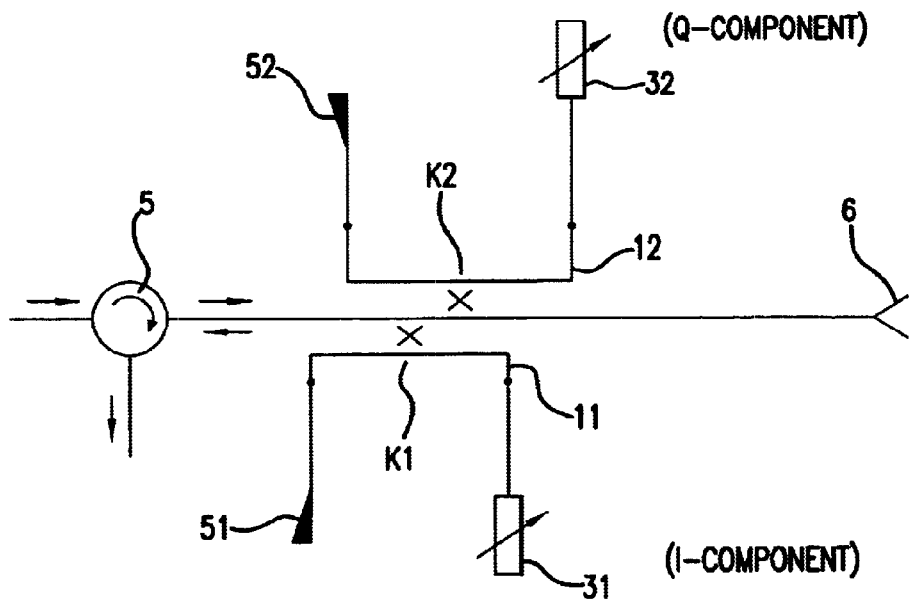
FIG. 2 is a block diagram depicting a reflection-modulator circuit, according to one embodiment of the invention.
Figure 3:
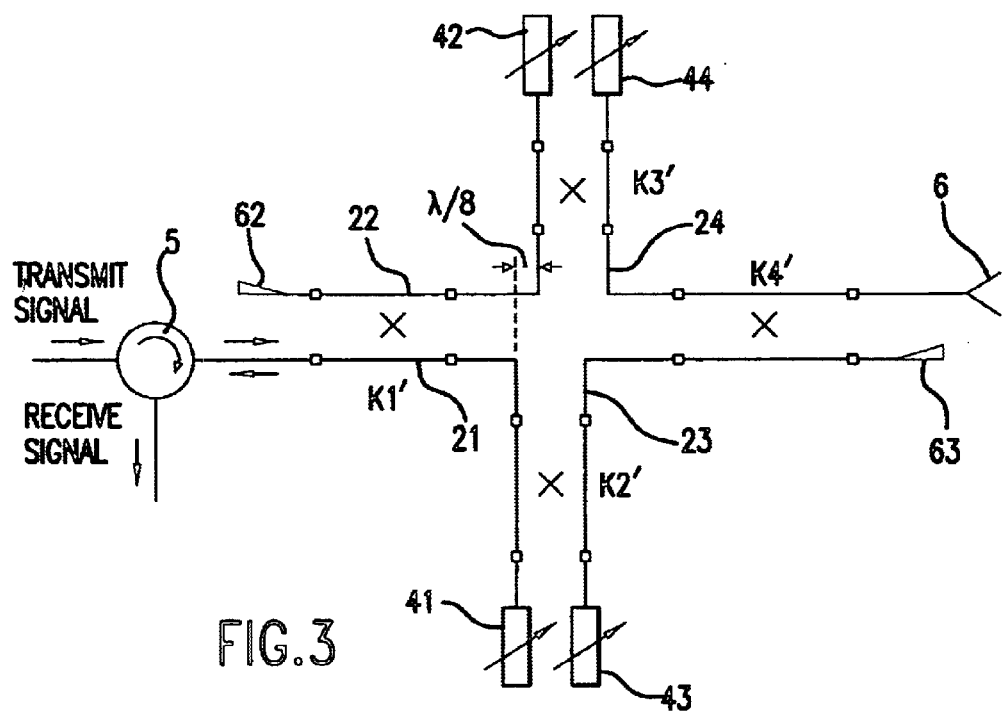
FIG. 3 is a block diagram depicting a reflection-modulator circuit, according to another embodiment of the invention.

In FIGS. 2 and 3, the reflection-modulator circuits 2 are presented in accordance with two embodiments of the invention. The reflection-modulator circuits 2 are inserted into the signal path between the circulator 5 and the transmit/receive antenna 6 of the continuous wave radar system. In general, the reflection-modulator circuit 2 includes a directional coupler arrangement, namely the directional couplers K1, K2 in the embodiment of FIG. 2, or the directional couplers K1', K2', K3', K4' in the embodiment of FIG. 3. This directional coupler arrangement serves to coupled out a part of the signal, traversing the signal path between the circulator 5 and the transmit/receive antenna 6. Furthermore, there is a controllable line termination arrangement, which is attached to the directional coupler arrangement K1, K2 and K1', K2', K3', K4', namely two controllable line terminations 31, 32 in the embodiment shown in FIG. 2, or four controllable line terminations 41, 42, 43, 44 in the embodiment shown in FIG. 3. These line terminations serve to set the reflection and/or absorption of the signal, coupled from the signal path between the circulator 5 and the transmit/receive antenna 6, in the sense of generating the above-described correction signal in response to a control signal, derived from the receiver circuit 9, 10.

In the embodiment shown in FIG. 2, the directional coupler arrangement K1, K2 includes in detail a first directional coupler K1 and a first branch 11 of the line, coupled by way of the first directional coupler to the signal path between the circulator 5 and the transmit/receive antenna 6. The first directional coupler K1 serves together with the first branch 11 of the line to coupled out an in-phase component I from the signal path between the circulator 5 and the transmit/receive antenna 6. Furthermore, the reflection-modulator circuit 2 includes a second directional coupler K2 and a second branch 12 of the line, coupled by way of said second directional coupler to the signal path between the circulator 5 and the transmit/receive antenna 6. The second directional coupler K2 and the second branch 12 of the line serve to couple a quadrature component Q from the signal path between the circulator 5 and the transmit/receive antenna 6. One end of the first branch 11 of the line is provided with a first controllable line termination 31, and one end of the second branch 12 of the line is provided with a second controllable line termination 32. The two controllable line terminations 31, 32 serve to set the reflection and/or absorption of the coupled out in-phase component I or the coupled out quadrature phase component Q, respectively. The respective other end of the first line branch 11 or of the second line branch 12 is provided with a respective first absorber 51 or a second absorber 52.

The two directional couplers K1 and K2 are shifted by $\lambda/8$. The transmitting signal, running from the circulator 5 to the transmit/receive antenna 6, is coupled out to some degree in proportion to the coupling factor on the first line branch 11, in-phase component I, or on the second line branch 12, quadrature phase component Q, by means of the directional couplers K1, K2. At the controllable line terminations 31 or 32, provided on the ends of the two line branches 11, 12, respectively, the coupled waves are reflected with positive or negative phase depending on the control state of the controllable line terminations 31, 32, or totally or partially absorbed, depending on the ratio of the characteristic impedance of the lines and the resistance of the controllable line terminations 31 or 32. The reflected waves run back into the directional couplers K1, K2, whereby they appear again reduced in size by the coupling factor on the signal path between the circulator 5 and the transmit/receive antenna 6 and run as the reflected waves backwards to the circulator 5 and from there to the receiver circuit 9, 10 and may compensate for the undesired coupling signal.

Owing to the shift of the two directional couplers K1, K2 by $\lambda/8$ on the main line, the two reflected waves are shifted by 90° with respect to each other (quadrature) on the main line, i.e., the signal path between the circulator 5 and the transmit/receive antenna 6. Not until the frequency changes by 5% does an error of approximately 0.45° appear.

Figure 4:
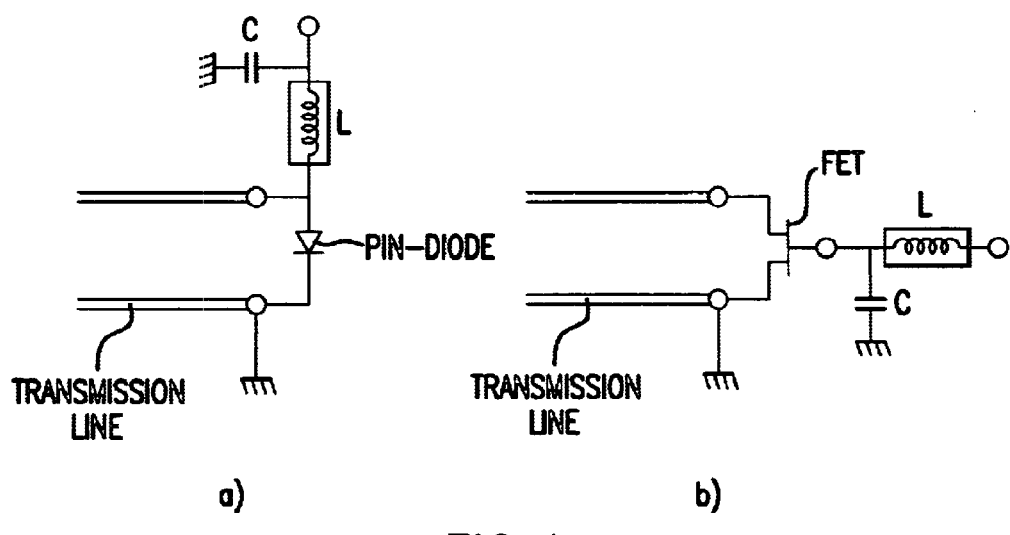
FIGS. 4a and b are block diagrams of controllable line terminations, as used in the reflection-modulator circuit, according to principles of the invention.

The controllable line terminations 31, 32, for different types of transmission lines like waveguide or microstripline, can be realized by using PIN diodes as shown in FIG. 4a, or, i.e., by using an FET circuit as shown in FIG. 4b. In the embodiments shown in FIGS. 4a and b, the control voltage Vcontrol is supplied by way of an uncoupling network L-C.

In the second embodiment of the reflection-modulator circuit 2 depicted in FIG. 3, the directional coupler arrangement includes a first directional coupler K1' for dividing a first part of the signal path which is connected to the circulator 5, and which is provided between the circulator 5 and the transmit/receive antenna 6, into a first branch 21 of the line and a second branch 22 of the line. Second and third directional couplers K2', K3' are provided at the first branch 21 of the line and at the second branch 22 of the line and couples them to a third branch 23 of the line or a fourth branch 24 of the line, respectively. A fourth directional coupler K4' is arranged in such a manner that it combines the third branch 23 of the line and the fourth branch 24 of the line to form a second part of the signal path that is connected to the transmit/receive antenna 6, and is provided between the circulator 5 and the antenna 6. The one end of each line branch 21, 22, 23, 24 is provided with a controllable line termination 41, 42, 43, 44, respectively. The controllable line terminations serve to set the reflection and/or the absorption of the in-phase and quadrature-phase components I, Q, respectively, of the signal coupled from the signal path. The one end of the first branch 21 of the line is provided with a controllable line termination 41, and the other end of the first branch 21 of the line is connected to the circulator 5. Similarly, the one end of the fourth branch 24 of the line is provided with a controllable line termination 44, and the other end of the fourth branch 24 of the line is connected to the transmit/receive antenna 6. First ends of the second and third line branches 22, 23 are provided with a controllable line terminations 42, 43, respectively, and other ends of the second and third line branches 22, 23 are provided with absorbers 62, 63, respectively. Between the second directional coupler K2' and the third directional coupler K3', there is a line length difference of $\lambda/8$ ($\lambda$=wavelength on the line) in order to obtain a 90° shift of the signals reflected in the second and third line branches 22, 23. The controllable line terminations 41, 42, 43, 44, allocated to each other in pairs, are provided on one end of the first and third line branches 21, 23, or on one end of the second and fourth line branches 22, 24.

The function of the directional coupler arrangement depicted in FIG. 3 exploits the property of directional couplers of shifting the coupled wave and the wave on the main line in phase by 90°. For couplers with −3 dB coupling factor, it may be used in symmetrical arrangement to extinguish portions of the signal. In the circuit depicted in FIG. 3, the transmitting signal, coming in from the circulator 5, is divided first between the first branch 21 of the line and the second branch 22 of the line in the coupler K1'. Then, this partial signal is sent by way of the second directional coupler K2' or the third directional coupler K3' to the third branch 23 or the fourth branch 24 of the line, respectively. Through insertion of a line length difference of $\lambda/8$ between the first branch 21 of the line and the second branch 22 of the line, the respective partial waves are shifted by 45°. Owing to the fourth directional coupler K4', provided between the third branch 23 of the line and the fourth branch 24 of the line, the two partial waves are added together again and fed to the output gate of the directional coupler arrangement, which is connected to the transmit/receive antenna 6. The operating mode of the circuit depends in essence on the state of the four controllable line terminations 41, 42, 43, 44. If the pairs of terminations are equal and exhibit the reflection factor amplitude 1, the waves, coming in from the couplers of K1', are all passed on to K4'; and there are no reflected waves. If the pairs of line terminations 41, 42 or 43, 44 are set differently, parts of the signal are reflected and the result is a partial wave that runs backwards and is fed back by way of the directional coupler K1' to the circulator 5 and by way of the circulator to the receiver circuit 9, 10, while the two partial signals, reflected into the first and second line branch 21, 22, are shifted by 90 degrees with respect to each other (I and Q signals).

The controllable line terminations 41, 42, 43, 44 may be realized by means of the above-described PIN diode or FET circuits, according to FIG. 4a or b, respectively. Varactor diode circuits may also be considered. In addition, other transmission line circuits with controllable input reflection factors, preferably having magnitude of approximately 1 and variable phase, are possible, i.e., a reflection phase shifter, for example in the form of a ferrite-filled waveguide with a short-circuit on one end and a magnetizing coil with current control. In addition, line structures with a plurality of discrete varactor or PIN diodes, or with distributed integrated diode structures may be used, or lines with electrically controllable dielectric material, such as ferroelectric materials, up to electro-mechanically controlled transmission lines and line elements (microsystem technology). Elements of this kind are known.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A continuous wave radar system, comprising:
   a transmitter circuit for generating radar transmitting signals;
   a transmit/receive antenna, coupled to the transmitter circuit by way of a circulator;
   a receiver circuit, which is coupled to the transmit/receive antenna by way of the circulator and which is intended to process radar echo signals of a target object, said radar echo signals being received at the transmit/receive antenna, wherein the circulator passes the transmitting signals, generated by the transmitter circuit, to the transmit/receive antenna and diverts the target object's echo signals, which are received by the transmit/receive antenna, to an input of the receiver circuit; and
   an RPC (reflected power canceller) circuit for suppressing parts of the transmitting signals, diverted from the transmitter circuit and/or by means of reflection from the transmit/receive antenna directly into the receiver circuit, in response to a control signal,
   wherein said RPC circuit comprises a reflection-modulator circuit,
   wherein said RPC circuit is connected into a signal path between the circulator and the transmit/receive antenna, for the purpose of generating a correction signal,
   wherein said correction signal compensates for directly diverted parts of the transmitting signal, and
   wherein the reflection modulator circuit comprises
      a directional coupler arrangement for coupling out a part of the signal, traversing a signal path between the circulator and the transmit/receive antenna, and
      a controllable line termination arrangement, attached to the directional coupler arrangement, for the purpose of setting the reflection and/or the absorption of the coupled signal in the sense of generating the correction signal in response to the control signal, derived from the receiver circuit.

2. The system of claim 1, wherein said directional coupler arrangement comprises a first directional coupler and a first branch of the line, coupled by way of said first directional coupler to the signal path between the circulator and the transmit/receive antenna, for the purpose of coupling out an in-phase component from said signal path, and a second directional coupler and a second branch of the line, coupled by way of the second directional coupler to the signal path between the circulator and the transmit/receive antenna, for the purpose of coupling out a quadrature component from this signal path, and that at one end of a first branch of the line there is a first controllable line termination for setting the reflection and/or absorption of the coupled in-phase component, and at one end of a second branch of the line there is a second controllable line termination for setting the reflection and/or absorption of the coupled quadrature component.

3. The system of claim 2, wherein a first absorber is provided on the other end of the first branch of the line and a second absorber is provided on the other end of the second branch of the line.

4. The system of claim 1, wherein the directional coupler arrangement comprises:
   a first directional coupler for dividing a first part of the signal path, which is connected to the circulator and is provided between the circulator and the transmit/receive antenna, into a first branch of the line and a second branch of the line;
   second and third directional couplers for coupling the first and second line branches to a third and fourth line branch, respectively; and
   a fourth directional coupler for combining the third and fourth line branches to form a second part of the signal path, which is connected to the transmit/receive antenna and is provided between the circulator and the transmit/receive antenna;
   wherein at on one end of the line branches there are controllable line terminations for setting the reflection and/or absorption of in-phase and quadrature components of the signal, uncoupled from the signal path.

5. The system of claim 4, wherein one end of the first branch of the line is provided with a controllable line termination and that the other end of the first branch of the line is connected to the circulator.

6. The system of claim 4, wherein one end of the fourth branch of the line is provided with a controllable line termination and the other end of the fourth branch of the line is connected to the transmit/receive antenna.

7. The system of claim 4, wherein a controllable line termination is provided on one end of the second and third line branch respectively and an absorber is provided on the other end of the second and third line branch, respectively.

8. The system of claim 4, wherein a line length difference of $\lambda/8$, where $\lambda$ is a wavelength on the line, is provided between the second directional coupler and the third directional coupler, in order to obtain a 90° shift of the signals reflected in the second and third line branch.

9. The system of claim 4, wherein the controllable line terminations, allocated in pairs to each other, are provided on one end of the first and third line branch and on one end of the second and fourth line branch.

10. The system of claim 1, wherein the controllable line terminations are formed by means of PIN diodes.

11. The system of claim 1, wherein the controllable line terminations are formed by means of FET circuits.

12. The system of claim 1, wherein the controllable line terminations are formed by means of varactor diodes.

13. The system of claim 1, wherein the directional couplers are formed with lines, coupled by means of holes into the waveguide walls, using waveguide technology.

14. The system of claim 4, wherein the second and third directional couplers are formed by magic T circuits.

15. The system of claim 5, wherein one end of the fourth branch of the line is provided with a controllable line termination, and the other end of the fourth branch of the line is connected to the transmit/receive antenna.

16. A continuous wave radar system, comprising:
a transmitter circuit for generating a radar transmitting signal:
a transmit/receive antenna, coupled to said transmitter circuit by way of a circulator;
a receiver circuit, and
an RPC (reflected power canceller) circuit,
  wherein said receiver circuit is coupled to said transmit/receive antenna by way of said circulator,
  wherein said receiver circuit processes a radar echo signal of a target object, said radar echo signal being received at said transmit/receive antenna,
  wherein said RPC circuit suppresses at least one part of said radar transmitting signal,
  wherein said at least one part of said radar transmitting signal is diverted from said transmit/receive antenna directly into said receiver circuit,
  wherein a second part of said radar transmitting signal is diverted from said transmit/receive antenna directly into said receiver circuit,
  wherein said circulator passes said radar transmitting signals, generated by said transmitter circuit, to said transmit/receive antenna,
  wherein said circulator diverts said radar echo signals, which are received by said transmit/receive antenna, to an input of said receiver circuit,
  wherein said RPC circuit suppresses said at least one part of said radar transmitting signal and said second part of said radar transmitting signal in response to a control signal,
  wherein said control signal is derived from said receiver circuit, and
  wherein said RPC circuit contains a reflection-modulator circuit.

17. The system of claim 16, wherein said RPC circuit is connected into the signal path between the circulator and the transmit/receive antenna.

18. The system of claim 17, wherein said RPC circuit generates a correction signal which compensates said at least one part of said radar transmitting signal.

19. The system of claim 18, wherein said reflection-modulator circuit comprises at least one directional coupler for coupled out said at least one part of said radar transmitting signal.

20. The system of claim 19, wherein said at least one directional coupler traverses a signal path between said circulator and said transmit/receive antenna.

21. The system of claim 20, wherein said reflection-modulator circuit comprises a controllable line termination attached to said at least one directional coupler.

22. The system of claim 21, wherein said controllable line termination sets at least one of a reflection and an absorption of a coupled signal.

* * * * *